(12) United States Patent
Ishibashi

(10) Patent No.: US 6,813,654 B1
(45) Date of Patent: Nov. 2, 2004

(54) DATA PROCESSING APPARATUS HAVING A FLOW CONTROL FUNCTION FOR MULTI-CAST TRANSFER

(75) Inventor: Yasuhiro Ishibashi, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 874 days.

(21) Appl. No.: 09/643,709

(22) Filed: Aug. 23, 2000

(30) Foreign Application Priority Data

Aug. 25, 1999 (JP) ............................................. 11-238775

(51) Int. Cl.[7] ................................................. G06F 3/00
(52) U.S. Cl. ............................. 710/36; 710/45; 710/57; 370/230; 370/232; 370/364; 370/468
(58) Field of Search ............................... 710/36, 45, 57; 370/230, 232, 364, 468

(56) References Cited

U.S. PATENT DOCUMENTS

| | | | |
|---|---|---|---|
| 5,530,695 A | * | 6/1996 | Dighe et al. ............... 370/232 |
| 5,809,021 A | * | 9/1998 | Diaz et al. ................. 370/364 |
| 5,917,502 A | | 6/1999 | Kirkland et al. |
| 6,046,981 A | * | 4/2000 | Ramamurthy et al. ....... 370/232 |
| 6,118,791 A | * | 9/2000 | Fichou et al. .............. 370/468 |
| 6,501,441 B1 | * | 12/2002 | Ludtke et al. .............. 345/1.1 |
| 6,590,865 B1 | * | 7/2003 | Ibaraki et al. .............. 370/230 |

* cited by examiner

Primary Examiner—Jeffrey Gaffin
Assistant Examiner—Niketa I. Patel
(74) Attorney, Agent, or Firm—Finnegan, Henderson, Farabow, Garrett & Dunner, L.L.P.

(57) ABSTRACT

Two transfer modes of a band-guaranteed cycle and an event-driven type asynchronous cycle are defined for a multimedia bus. In the band-guaranteed cycle, stream data is transferred between nodes, to which the same channel number is assigned, in peer-to-peer mode using a reserved band for each cycle time. If the same channel number is assigned to a plurality of receiver nodes, a multi-cast transfer can be achieved by the band-guaranteed cycle. The multi-cast transfer using the band-guaranteed cycle can be stopped even in response to an instruction from any receiver node, and a buffer of each receiver node can be prevented from overflowing.

6 Claims, 8 Drawing Sheets

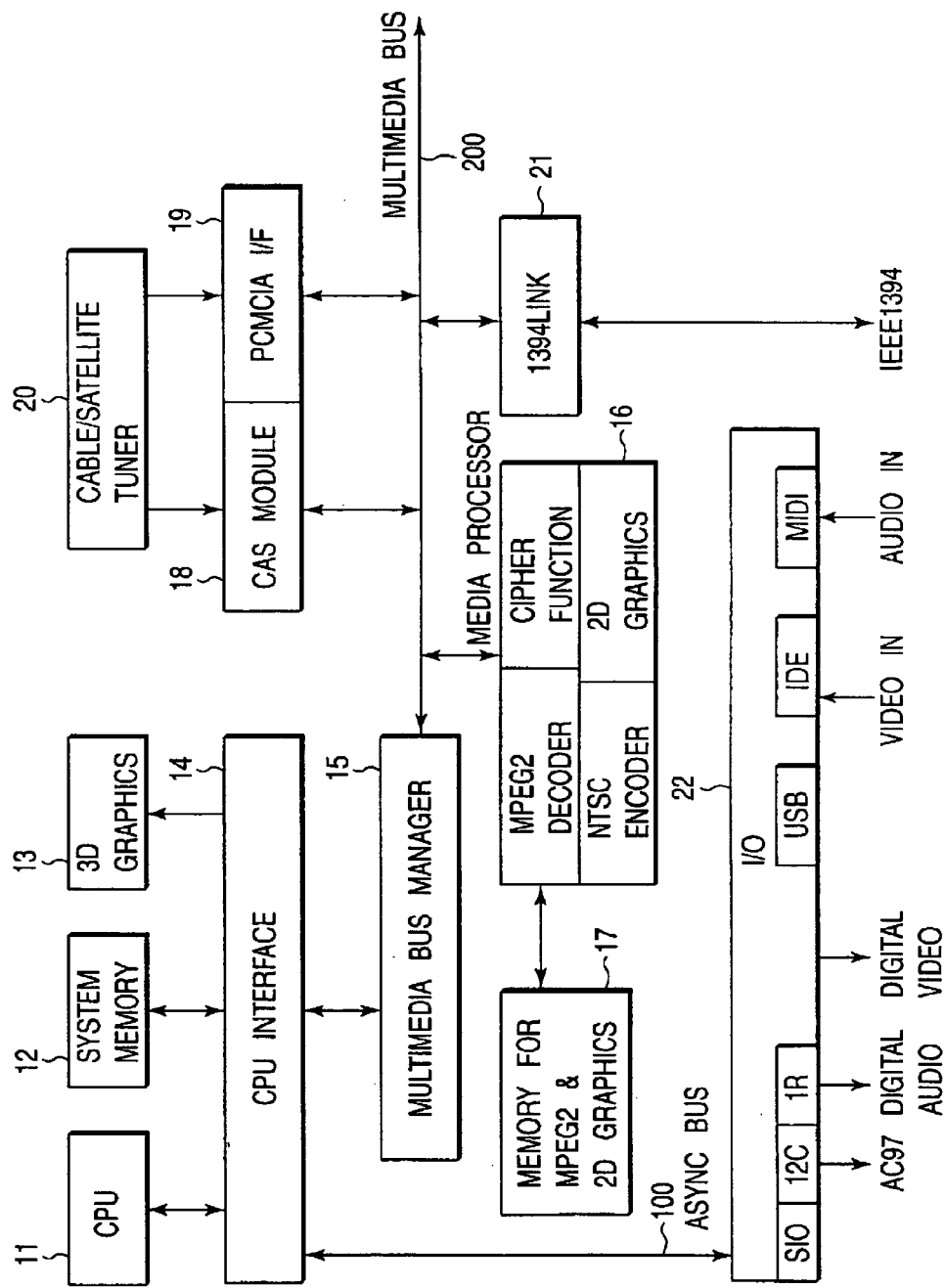
F I G. 1

CHANNEL CONTROL REGISTER IN CONFIGRATION
| Config Add. | Ch Cnt.(8bit) | Ch No.(8bit) | Necessity (16bit) |
|---|---|---|---|
| 10 | | 2 | 123 |
| 14 | | 3 | 456 |
| 18 | | 4 | 789 |
| 7 | 6 | 5 | 4 | 3 | 2 | 1 | 0 |
|---|---|---|---|---|---|---|---|
| Ch Ava | In/Out | Reject | | | | | |
FIG. 4
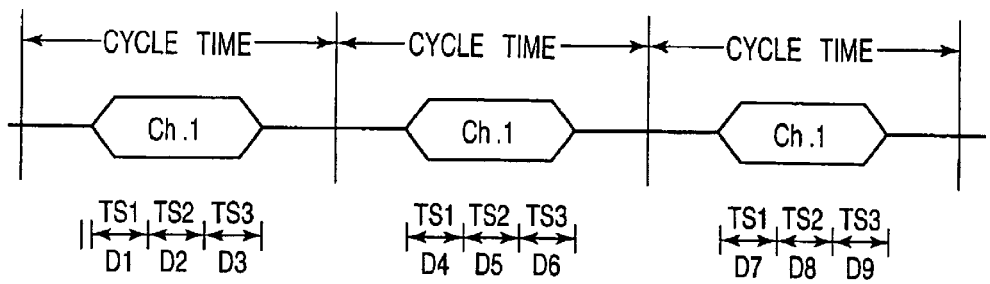
FIG. 5A
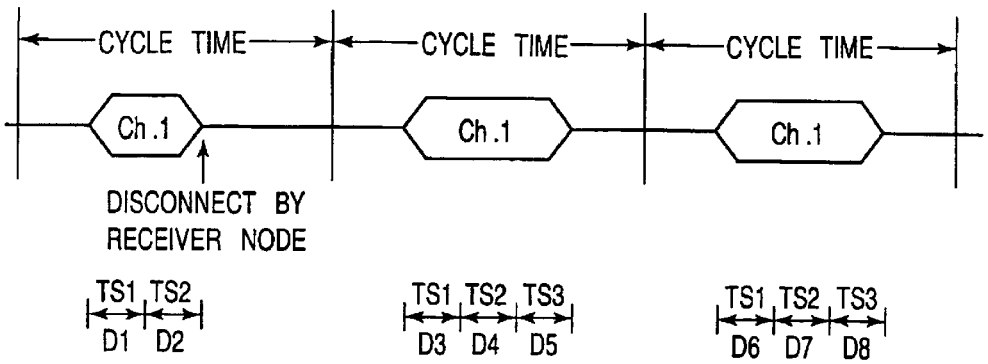
FIG. 5B

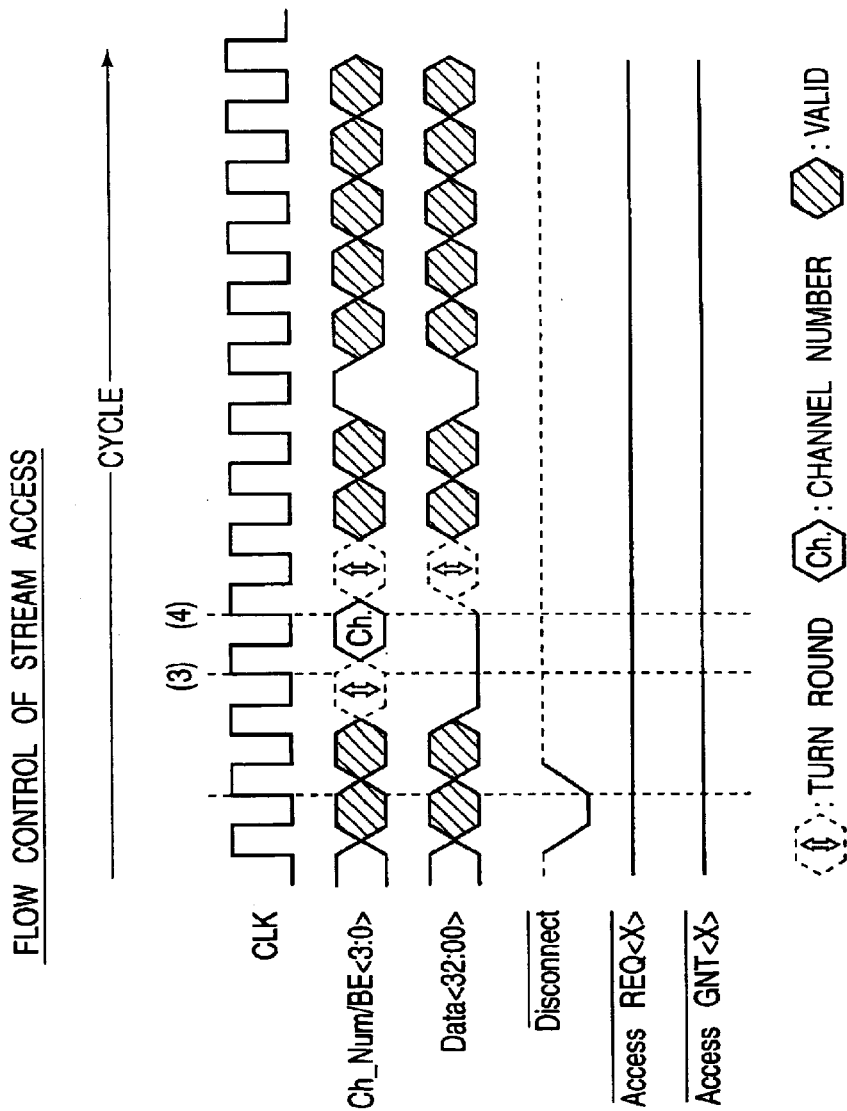
F I G. 6

DATA PROCESSING APPARATUS HAVING A FLOW CONTROL FUNCTION FOR MULTI-CAST TRANSFER

CROSS-REFERENCE TO RELATED APPLICATIONS

This application is based upon and claims the benefit of priority from the prior Japanese Patent Application No. 11-238775 (publication number 2001-067309), filed Aug. 25, 1999, the entire contents of which are incorporated herein by reference.

BACKGROUND OF THE INVENTION

The present invention relates to a data processing apparatus and a data transfer control method thereof and, more particularly, to a data processing apparatus for processing various kinds of data, such as audio/video data, other data and programs, and a data transfer control method thereof.

Recently, as the computer technology is advancing, various types of digital information device, such as multimedia-handling personal computers, set-top boxes, digital TVs and game machines, have been developed. There has been a demand for a capability to handle various kinds of media, such as broadcasting media, communication media and storage media, in digital information devices of this type.

Accordingly, people are demanding that personal computers should be provided with a function of processing AV (Audio/Video) stream data that needs real-time processing in addition to functions of processing ordinary programs. For consumer AV machines, such as set-top boxes, digital TVs and game machines, there has been a demand for a function of processing computer data, i.e., data other than A/V stream data, and programs, in order to adapt the machines to software-controlled interactive title playback or the like.

Because the bus architecture of conventional computers handle an AV stream and computer data as the same type, however, they are inadequate to feed AV streams that demand highly real-time processing. When a traffic of computer data becomes suddenly heavy while AV stream data and computer data are flowing on the bus at the same time (e.g., at the time of printing or accessing to a file), the AV stream data brings about a significant transfer delay. The reason is as follows. AV stream data and computer data are not distinguished from each other when they are transferred on the bus and thus it is not possible to perform a process of causing AV stream data, which needs real-time processing, flow first by priority.

Further, since the architectures of conventional computer machines have a difficulty in guaranteeing the latency of data transfer, they require that a huge buffer for guaranteeing the latency be provided in an AV device or the like which is to be connected to the bus. In a case of handling streams of a variable bit rate, such as DVD titles, it was necessary to install a large buffer so that the buffer on a reception-side device would not overflow even at the maximum transfer rate. This requirement is a big factor to increase the cost. In order to multi-cast AV stream data to a plurality of devices, a huge buffer has to be provided at every device on the receiver side. This increases the cost greatly.

Furthermore, if priority is given only to the transfer of AV stream data, when an event which needs fast processing occurs, a process for that event may be delayed.

Conventional AV machines physically accomplish peer-to-peer connection of devices that handle AV streams by connecting a plurality of devices in the processing order of the AV streams. Therefore, in conventional AV machine, AV streams are not basically input to a CPU. The recent appearance of media (hyper media), which has AV streams and interactive commands integrated, demands that a CPU should process streams. This makes the present physical peer-to-peer connection of devices difficult, and studies on bus connection have started.

BRIEF SUMMARY OF THE INVENTION

An object of the present invention is to provide a data processing apparatus capable of an efficient multi-cast transfer of stream data through a bus without providing any huge buffer, and a data transfer control method of the data processing apparatus.

To attain the above object, a data processing apparatus according to the present invention comprises a bus for which a band-guaranteed cycle capable of transferring stream data in real time by assigning a predetermined reserved band for each cycle time is defined, a plurality of nodes connected to the bus and capable of transmitting/receiving stream data using the band-guaranteed cycle, means for executing a multi-cast transfer of stream data from a sender node to a plurality of receiver nodes using the band-guaranteed cycle, and means for detecting that any of the plurality of receiver nodes drives a signal line in the bus, which indicates a completion of a data transfer cycle; and means for stopping the multi-cast transfer upon detection of the detecting means.

In the above arrangement, too, the problem of a drive conflict among signals of the plural receiver nodes can be resolved without decreasing the bus use efficiency.

According to the system of the present embodiment described above, the use of the bus in which the band-guaranteed cycle is defined as a transfer mode allows the band of stream data requiring a high degree of real time to be guaranteed. Usually data transfer cannot be intermitted during the band-guaranteed cycle; however, in the present invention, the transmission of stream data from the sender node can be stopped under the control of the receiver node, even during the band-guaranteed cycle.

The multi-cast transfer using the band-guaranteed cycle can be stopped even in response to an instruction from any receiver node. The provision of this scheme of stopping the multi-cast transfer of stream data under the control of the receiver node can prevent the buffer from overflowing even when such overflowing is likely to occur at any receiver node for the multi-cast due to a delay in the stream processing and reception of a variable bit rate stream. It is therefore possible to efficiently execute the multi-cast transfer of stream data through the bus only with the least required buffer.

When the signal line for indicating the completion of a data transfer cycle is so formed that it can be driven by any receiver node, if a drive conflict occurs among signals of the plural receiver nodes, the signal line is set in an unstable state between low and high levels, thus causing the device to malfunction. Therefore, a pull-up or pull-down load circuit is connected to the signal line, and it is preferable that an operation for driving the signal line into the active state be performed through an output buffer provided at each receiver node. The above problem can thus be resolved. Since, in this case, a shift of the signal line from the active state to the inactive state is performed by the load circuit, a relatively long time is required and accordingly an operator therefore has to wait a long time until the transfer of data is started through the multimedia bus, and it is likely that bus use efficiency will be reduced. It is therefore preferable to further comprise acceleration means for driving the signal line into an inactive state for a predetermined time period after the signal line is driven into the active state by the receiver node in order to accelerate a shift of the signal line to the inactive state. If the acceleration means is provided at the manager node to allow it to drive the signal line into the inactive state, the operation can be increased further in reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating the configuration of a system of a data processing apparatus according to one embodiment of the present invention;

FIG. 4 is a diagram showing a channel control register used in the system of the embodiment;

FIGS. 5A and 5B are diagrams for explaining the principle of reserved band cycle flow control which is used in the embodiment;

FIG. 6 is a timing chart showing specific timing for the flow control in FIGS. 5A and 5B;

DETAILED DESCRIPTION OF THE INVENTION

Figure 2:
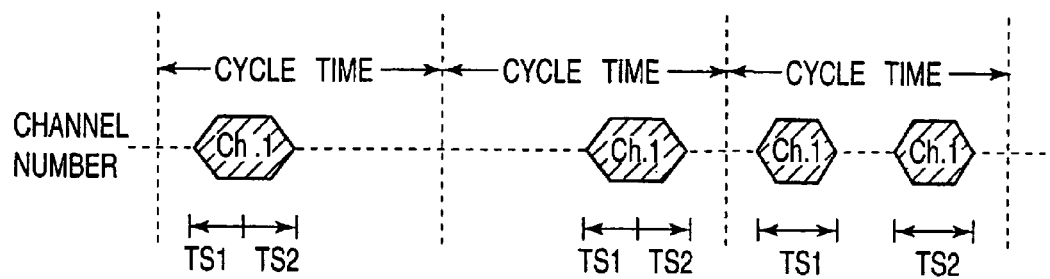
FIG. 2 is a diagram for explaining cycle time used in a multimedia bus of the system according to the embodiment.

An embodiment of the present invention will now be described with reference to the accompanying drawings.

FIG. 1 illustrates the system configuration of a data processing apparatus according to one embodiment of the present invention. This data processing apparatus is a multimedia-handling computer capable of handling various kinds of media, such as broadcasting media, communication media and storage media. To achieve both a program executing function and a function of dealing with AV (Audio/ Video) stream data on a high order, the data processing apparatus has a multimedia bus 200 in addition to an ordinary internal bus (Async Bus) 100 which executes event-driven type asynchronous transfer. The multimedia bus 200 is an internal bus for which two transfer modes of a band-guaranteed cycle capable of transferring AV stream data in real time and an event-driven type asynchronous transfer cycle, are defined. The use of the multimedia bus 200 can permit both computer data and AV stream data to be transferred with efficiency. The band-guaranteed cycle basically means a transfer mode in which stream data is transferred in a real-time-guaranteed state by assigning a predetermined time period to be used for data transfer for each cycle time as a reserved band. In other words, the band-guaranteed cycle corresponds to a so-called isochronous cycle.

In the band-guaranteed cycle, the transfer bandwidth of stream data can be varied according to the time period assigned as a reserved band for each cycle time.

System Structure

The system structure will now be specifically discussed below.

As illustrated, the system of the data processing apparatus comprises a CPU 11, a system memory 12, a 3D graphics accelerator 13 and a CPU interface 14. The CPU 11, system memory 12 and 3D graphics accelerator 13 are mutually connected by the CPU interface 14, and execute a program executing routine, a 3D graphics computation routine and so forth. The CPU interface 14 is a host bus bridge which bidirectionally connects the CPU bus and the internal bus 100. An I/O controller 22C is connected to the internal bus 100, and has various interfaces including an interface for outputting digital video signals to an external AV machine or the like and other interfaces for communication with various kinds of peripheral devices (an SIO interface, an I$^2$C bus interface, an IR (Infrared) interface, a USB interface, an IDE interface and an MIDI interface). Storage devices such as a DVD drive and an HDD are connected to the I/O controller 22 via the IDE interface.

As illustrated, a multimedia bus manager 15, a media processor 16, a CAS module 18, a PCMCIA interface 19, and an IEEE1394 interface 21 are connected to the multimedia bus 200. Those multimedia bus manager 15, media processor 16, CAS module 18, PCMCIA interface 19 and IEEE1394 interface 21 are nodes (devices) each of which performs data transfer via the multimedia bus 200 and can use the aforementioned band-guaranteed cycle and asynchronous transfer cycle.

The multimedia bus manager 15 is the manager node for the multimedia bus 200, and performs control to execute the band-guaranteed cycle and asynchronous transfer cycle on the multimedia bus 200. Specifically, the multimedia bus manager 15 manages a reserved band, which is used in the band-guaranteed cycle, and a cycle time and performs data transfer control. The multimedia bus manager 15 also has a function of bidirectionally connecting the multimedia bus 200 and the CPU interface 14, so that it can send an AV stream, which is transferred from another node on the multimedia bus 200, to the CPU 11 and send an AV stream, which is fetched into the system memory 12 from a DVD drive, to another node on the multimedia bus 200.

The media processor 16 has capabilities such as MPEG-2 decoding, stream ciphering, NTSC encoding and 2D graphics computation. It is the media processor 16 which executes control to reproduce and display an AV stream. The CAS module 18 is an exclusive interface for connection of a CATV/satellite tuner 20. The CATV/satellite tuner 20 can be connected via the PCMCIA interface 19.

The fundamental usage of the multimedia bus 200 will now be explained.

First, a description will be given of a case where video data received by the CATV/satellite tuner 20 is sent to a storage device and an external IEEE1394 device while being displayed on a monitor.

The video data consists of MPEG2 transport streams (MPEG2_TS) which are sent to the media processor 16 from the CAS module 18 or the PCMCIA interface 19. In this case, the same channel number (e.g., channel number 1) is assigned to the CAS module 18 or the PCMCIA interface 19 which serves as a sender node and the media processor 16 which serves as a receiver node. Then, the sender node sends an MPEG-2 transport stream to the receiver node in peer-to-peer mode in the aforementioned band-guaranteed cycle. The media processor 16 performs, in parallel, a process of decoding the MPEG-2 transport stream and reproducing and displaying the decoded stream and a ciphering to protect the MPEG-2 transport stream from an unauthorized copy. The ciphered stream data is sent from the media processor 16 to the multimedia bus manager 15 and the IEEE1394 interface 21 in order. In this case, the same channel number (e.g., channel number 2) is assigned to the media processor 16 which is a sender node and the multimedia bus manager 15 and the IEEE1394 interface 21 which are receiver nodes. As a result, data transfer from the media processor 16 to the multimedia bus manager 15 is carried out in peer-to-peer mode and so is data transfer from the media processor 16 to the IEEE1394 interface 21. This stream transfer with the channel number 2 is performed in parallel to the stream transfer with the channel number 1 in a time-divisional manner.

The ciphered stream is temporarily loaded in the system memory 12 via the multimedia bus manager 15 and the CPU interface 14, and then recorded on a storage device via the I/O controller 22. At the same time, the encoded stream is transferred to an external IEEE1394 device from the IEEE1394 interface 21.

Multimedia Bus

A specific transfer control scheme for the multimedia bus 200 will now be discussed.

1) Cycle Time

As shown in FIG. 2, accesses to the multimedia bus 200 are carried out by dividing the time by given time units. This given interval is called "cycle time".

2) Transfer Mode

To realize the aforementioned two transfer modes, the multimedia bus 200 has two kind of bands. One is a reserved band and the other is an asynchronous band (hereinafter called "async band"). The reserved band is a band reserved in a cycle time for band-guaranteed transfer. A transfer cycle which uses this reserved band is the aforementioned band-guaranteed cycle (hereinafter called "reserved band cycle"), and a transfer cycle which uses the async band is the aforementioned asynchronous transfer cycle (hereinafter called "async cycle").

It is to be noted that the reserved band is not clearly distinguished from the async band by time, but a band which is processing a reserved band is the reserved band and a transfer cycle which is executed as needed in accordance with an access request in a period other than the reserved band is the async band.

3) Channels

All the accesses to the multimedia bus 200 are managed by channels, so that transfer over a plurality of channels can be performed in a time-divisional manner. FIG. 2 shows an example where a time of two time slots (TS1, TS2) is reserved as the reserved bandwidth of the channel 1. The two time slots should not necessarily be consecutive along the time, but have only to be allocated within one cycle time.

4) Types of Accesses

There are following three types of accesses.

a) Stream Access

Figure 3:
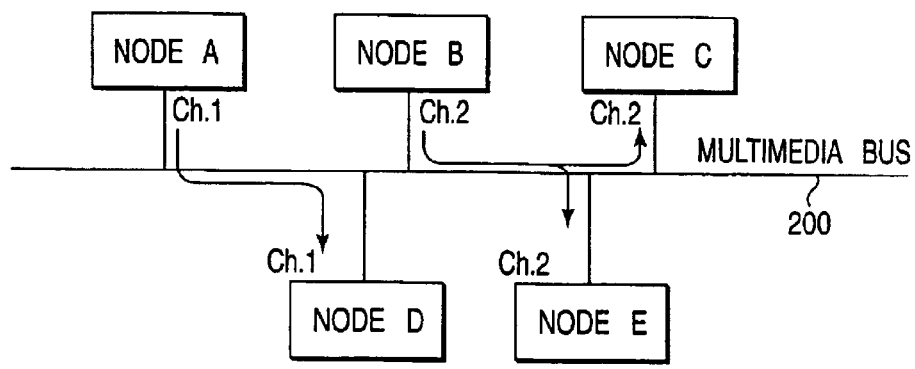
FIG. 3 is a diagram for explaining a stream access which is used in the multimedia bus according to the embodiment.

In the stream access, a sender node and a receiver node are designated for each channel and no other addresses than the channel are used. Wait control from the receiver side as in an ordinary PCI bus transaction is not carried out either. How this stream access is done is illustrated in FIG. 3. In FIG. 3, a node A is the sender node with the channel number 1 and a node D is the receiver node with the channel number 1. In this case, the nodes A and D to both of which the channel number 1 is assigned are logically connected on the multimedia bus 200 in a peer-to-peer fashion, and data transfer between the nodes A and D is directly carried out. For a single sender node, a plurality of receiver nodes with the same channel number as that of the sender node may be provided. FIG. 3 shows a case where a node B is the sender node with the channel number 2 and nodes C and E are the receiver nodes that have the channel number 2. In this case, stream data from the node B is multi-cast to the nodes C and E. In the multi-cast, stream data can be transferred to a plurality of receiver nodes at once while guaranteeing the real time thereof. If, therefore, video data received by the CATV/satellite tuner 20 is multi-cast to the media processor 16 and IEEE1394 interface 21, it can be supplied to an external IEEE1394 device while being reproduced.

According to this embodiment, the stream access is always used in the reserved band cycle. But, the stream access can also be used in the async cycle.

b) Single Access

This access is used only in the Async cycle and consists of an address and command transfer phase and a single data transfer phase following the former phase.

c) Burst Access

This access is used only in the Async cycle and consists of an address and command transfer phase and a plurality of data transfer phases following the former phase.

Channel Control Register

FIG. 4 shows the contents of a channel control register provided in each node on the multimedia bus 200.

The channel control register is defined in the configuration space of each node and can have control information for a plurality of channels. The control information for each channel is constructed with channel control information (Ch Cnt), channel number information (Ch No.) and necessary band information (Necessity) as one set. The necessary band information indicates a band necessary for stream transfer, and is set for each stream to be transmitted and received by the driver (software) of the associated node. The channel number information indicates the channel number set by the manager node. The channel control information includes channel available information (Ch. Ava) indicating whether or not the associated channel is available and I/O information (In/Out) indicating whether the associated channel is an input channel (receiver node) or an output channel (sender node).

As to which node takes an output/input action to which node, the manager node informs before access starts by using a configuration register.

Flow Control in Reserved Band Cycle

According to this embodiment, the following three functions are prepared for transfer control in the reserved band cycle.

1) Flow control in reserved band cycle which stops stream access under the control of the receiver node.

A signal line (Disconnect) defined on the multimedia bus 200 is used for the flow control. Each node is connected to the signal line (Disconnect) in a wired OR fashion. When stream access is executed by the multi-cast, if one of the plurality of receiver nodes for the multi-cast makes the signal line active, the transmission of stream data from the sender node is forcibly stopped.

The principle of the flow control in a reserved band cycle will be explained referring to FIGS. 5A and 5B. FIG. 5A presents a timing chart for a case where a stream access of channel number 1 (Ch. 1) is carried out using a reserved band cycle of three time slots (TS1, TS2, TS3). When a disconnect signal (Disconnect) is asserted on the multimedia bus 200 by the receiver node during execution of the reserved band cycle, as shown in FIG. 5B, the sender node stops the current stream access and interrupts transmission of stream data in response to the disconnect signal. The disconnect signal (Disconnect) represents the completion of the current transfer cycle. When the next cycle time comes, the sender node restarts the interrupted stream access for transmitting subsequent stream data.

The provision of this scheme of stopping a stream access under the control of the receiver node, particularly the stopping of multi-cast transfer using a band-guarantee cycle in response to an instruction from any receiver node, can prevent the buffer of the receiver node from overflowing even when such overflowing is likely to occur due to a delay in the stream processing and reception of a variable bit rate stream. It is therefore possible to efficiently execute the required real-time transfer only with the least required buffer.

FIG. 6 specifically shows timing for the flow control.

First, signal lines included in the multimedia bus 200 will be explained. The multimedia bus 200 includes a clock signal (CLK) line, a 3-bit channel number/byte enable signal (ch_Num/BE) line, a 32-bit data (Data) line, a disconnect signal (Disconnect) line, a bus request signal (Access REQ) line, a bus grant signal (Access GNT) line and a ready signal (Ready) line. The upper line "¯" represents an active-low signal.

The channel number/byte enable signal (ch_Num/BE) indicates the channel number (Ch.) whose stream access is to be started at the address phase of reserved band cycle, and indicates a valid byte lane of data on the data line at the data phase of the reserved band cycle. The channel number is output by the manager node in the reserved band cycle but is output by a bus mater node which has obtained a bus-using permission in the Async cycle.

The disconnect signal (Disconnect) is a signal to disconnect nodes from the current stream access and indicates the completion and switching of the current transfer cycle. To forcibly stop transmission of stream data from the sender node during stream access, the receiver node outputs this disconnect signal (Disconnect). As the disconnect signal (Disconnect) usually indicates the end of a stream access, the manager node outputs the disconnect signal (Disconnect).

The access request signal (Access REQ) and access grant signal (Access GNT) are used to manage the bus-using permission for the Async cycle. The paired request signal (Access REQ) and access grant signal (Access GNT) are provided between the manager node that performs bus management and each node. An access request (bus-using permission request) is made using the Access REQsignal. The node which wants to access the bus asserts the Access REQ. Arbitration of the access request is carried out by the manager node. This node is informed of access permission by the Access GNT, which is asserted at the same time as the assertion of Disconnect. The node that is requesting an access latches the Disconnectand Access GNTby the CLK and when the Disconnectis asserted, the node to which the Access GNTis asserted obtains the bus-using permission (master node).

In a stream access, each node can receive and output data in accordance with the clock CLK when its own channel number is designated by the channel number/byte enable signal (ch_Num/BE). The channel number is output from the rising edge of the third clock from the clock at which the Disconnectsignal (indicating the end of the access cycle) has been asserted, and is latched at the rising edge of the fourth clock. Since, in the reserved band cycle, the manager node serves as the master, assertion of the Access REQthat requests stream access is inhibited. In the stream access mode, no wait control by the Readysignal is not performed.

When the capacity of the reception buffer becomes smaller during a stream access in the reserved band cycle, the receiver node asserts the disconnect signal (Disconnect). Asserting the disconnect signal causes the sender node to stop stream transfer. As a result, the stream access which is in underway is terminated (intermitted). Thereafter, as mentioned above, the channel number to be accessed next is output from the manager node at the rising edge of the third clock from the clock at which the disconnect signal (indicating the end of the access cycle) has been asserted. When the next cycle time comes, the sender node, at which the transmission of stream data is stopped, restarts the intermitted stream data transfer.

Figure 7A:
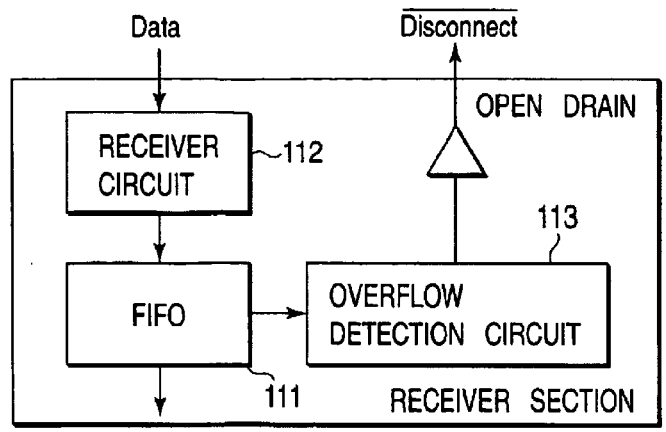
FIGS. 7A and 7B are diagrams exemplifying a hardware structure which accomplishes the flow control in FIGS. 5A and 5B.
Figure 7B:
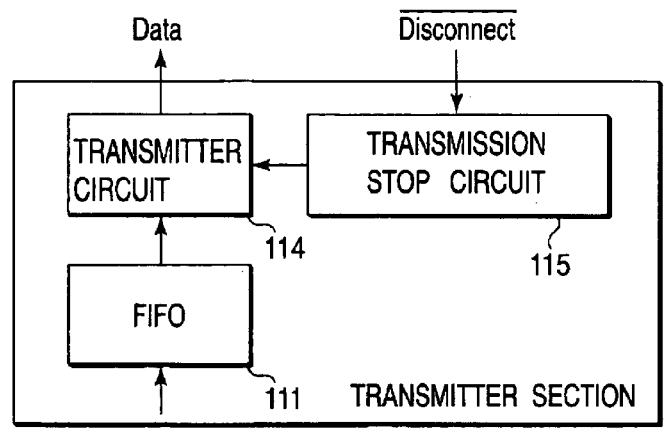

FIGS. 7A and 7B exemplify a hardware structure which accomplishes the flow control using the disconnect signal.

As shown in FIG. 7A, the reception section of each node is provided with a FIFO buffer 111, a reception circuit 112 and an overflow detection circuit 113. The FIFO buffer 111 is an input/output buffer for temporarily storing data that is exchanged via the multimedia bus 200. At the time of reception, stream data input via the multimedia bus 200 to the reception circuit 112, and sequentially written in the FIFO buffer 111. The stream data stored in the FIFO buffer 111 is read out and processed by an internal processing circuit. The overflow detection circuit 113 detects if the amount of data stored in the FIFO buffer 111 has exceeded a predetermined threshold value. When the amount of data stored in the FIFO buffer 111 has exceeded the predetermined threshold value, the disconnect signal is generated to prevent the FIFO buffer 111 from overflowing. The nodes other than the manager node are connected to the disconnect signal line through an open-drain output buffer. The open-drain type buffer drives the disconnect signal line into an active-low state. The reason why the open-drain buffer is used will be described in detail with reference to FIG. 9.

FIG. 7B shows the structure of a transmission section of each node. At the time of transmission, stream data externally input is input to the FIFO buffer 111. This stream data is read from the FIFO buffer 111 and sent on the multimedia bus 200 via a transmission circuit 114. During transmission of stream data, a transmission stopping circuit 115 monitors the disconnect signal. When the disconnect signal is asserted during transmission of stream data, the transmission stopping circuit 115 controls the transmission circuit 114 to stop the transmission of the stream data.

Figure 8:
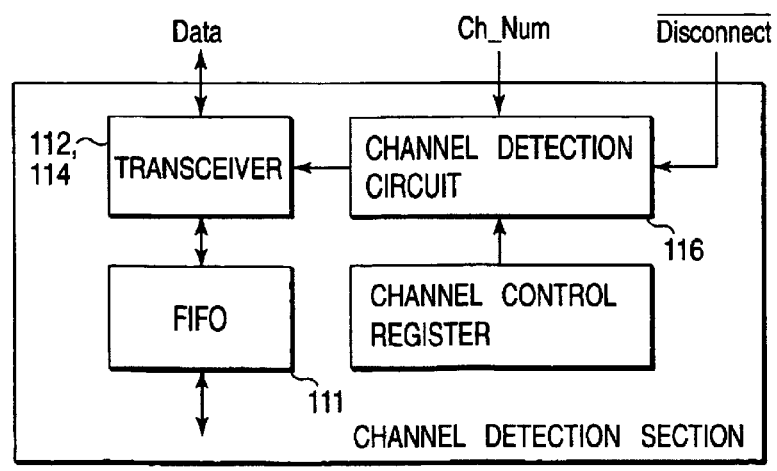
FIG. 8 is a diagram depicting the structure of a channel detecting section provided for each node in the embodiment.

FIG. 8 depicts the structure of a channel detecting section provided in each node in this embodiment.

A channel detecting circuit 116 latches the channel number output on the multimedia bus 200 at the third clock from the assertion of the disconnect signal, and compares it with the channel number set in its own channel control register. When these channel numbers coincide with each other, the channel detecting circuit 116 controls the transmission circuit and the reception circuit to start data input/output by the stream access.

Figure 9:
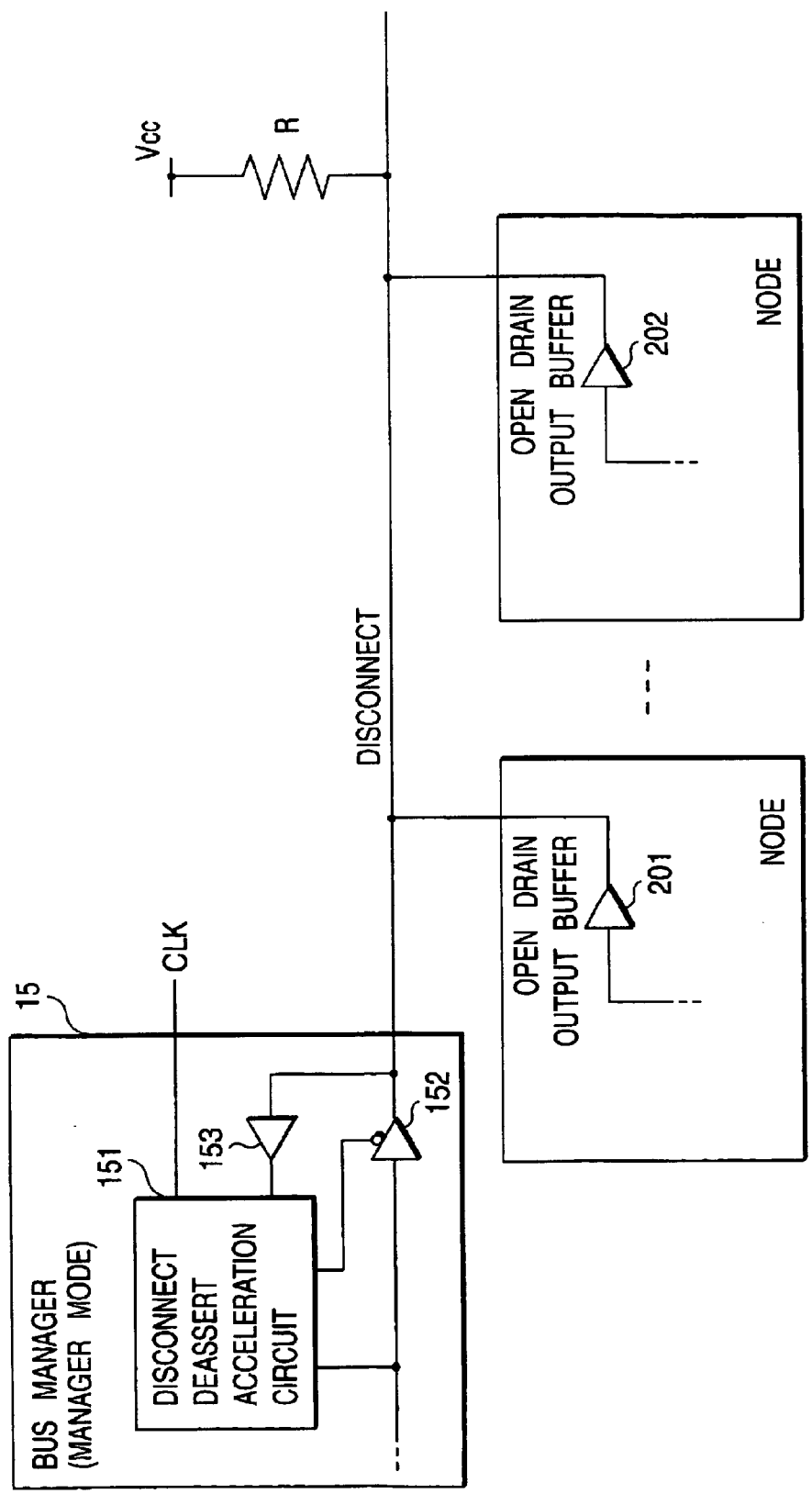
FIG. 9 is a diagram showing a circuit arrangement of circuits around a disconnect signal line used for the flow control shown in FIGS. 5A and 5B.

Referring to FIG. 9, the arrangement of circuits around the disconnect signal line will now be explained.

Since, in the foregoing embodiment, the disconnect signal line is so formed that it can be driven by any receiver node, a drive conflict occurs among signals of the plural receiver nodes. If a receiver node drives the disconnect signal line into an inactive-high state when another receiver node drives it into an active-low state, the disconnect signal line will be set in an unstable state between low and high levels, thus causing the system to malfunction.

In FIG. 9, the disconnect signal line is connected to a power supply terminal via a pull-up resistor R, and the nodes other than the manager node are so constituted that they drive the disconnect signal line by means of open-drain output buffers 201 and 202 thereof. Thus, the nodes other than the manager node drive the disconnect signal line only into the active-low state. Even though a drive conflict is caused by the plural receiver nodes, the event in which the disconnect signal line will be set in the unstable state between low and high levels, can be prevented.

However, it takes a relatively long time to shift the active-low state of the disconnect signal line to the inactive-high state. An operator therefore has to wait a long time until the transfer of data is started/restarted through the multimedia bus 200, and it is likely that bus use efficiency will be reduced.

In the present embodiment, as shown in FIG. 9, a disconnect de-assert acceleration circuit 151, 3-state output buffer 152, and an input buffer 153 are provided in the multimedia bus manager 15 serving as the manager node in order to accelerate the speed of shift from the active-low state to the inactive-high state.

The disconnect de-assert acceleration circuit 151 monitors the disconnect signal line through the input buffer 153 and detects whether the disconnect signal line is asserted as active low at the timing of the rising edge of a clock CLK. When the circuit 151 detects that the disconnect signal line has asserted as active low, the disconnect de-assert acceleration circuit 151 drives the disconnect signal line into the inactive-high state for a give period of time (1CLK period) using the 3-state output buffer 152 in order to accelerate the speed of shift from the active-low state to the inactive-high state. The de-assert of the disconnect signal line (shift from "Low" to "High") can thus be accelerated, as compared with the shift from the "Low" to the state "High" caused by only the pull-up register R.

Figure 10:
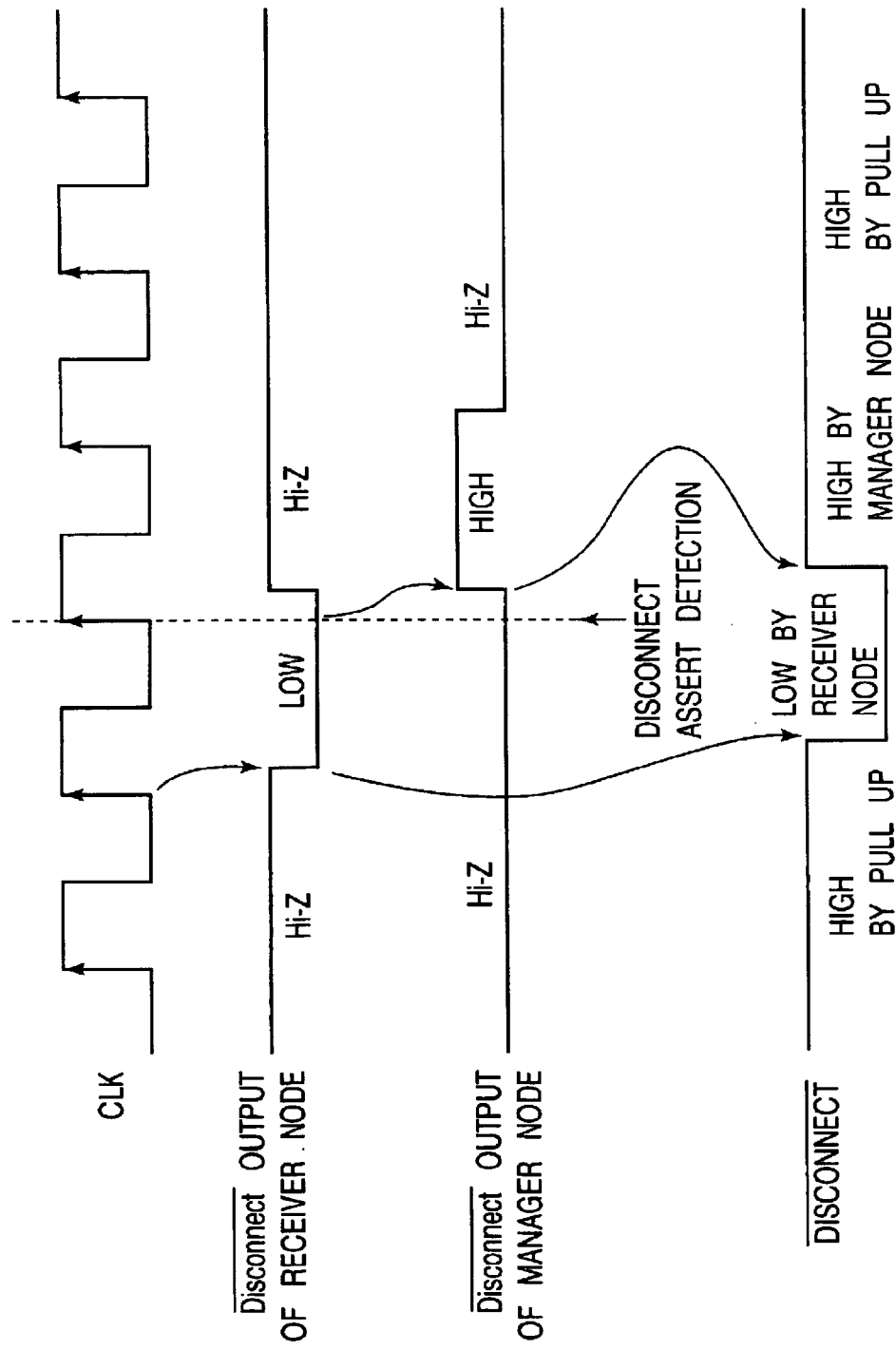
FIG. 10 is a timing chart showing an example of timing of the disconnect signal line at the time of flow control used in the embodiment.

FIG. 10 shows control timing of the disconnect signal line at the time of flow control.

If an overflow is detected at any receive node during the multi-cast transfer, an output signal (Disconnect) from the open-drain output buffer provided at the receiver node is switched from "high impedance (Hi-Z)" to "Low". The disconnect signal line is therefore switched from the inactive-high state set by the pull-up resistor R to the active-low state and the current multicast transfer is stopped.

The receiver node drives the disconnect signal line only for a period of a 1CLK cycle. After that, the output signal (Disconnect) from the open-drain output buffer provided at the receiver node is returned to the "high impedance (Hi-Z)".

Detecting that the disconnect signal line is asserted as the active-low state at the rising edge of the clock CLK, the manager node drives the disconnect signal line into the inactive-high state for a period of 1CLK cycle using the 3-state output buffer 152. Thus, the disconnect signal line quickly shifts from the active-low state to the inactive-high state. After that, the disconnect signal line is maintained in the inactive-high state by the pull-up resistor R.

Another example of control timing for accelerating a shift of the disconnect signal line from the active-low state to the inactive-high state will now be described.

Figure 11:
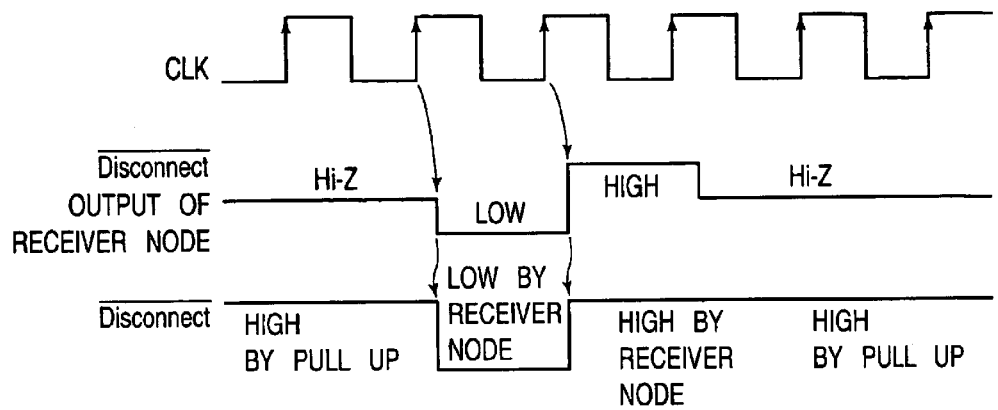
FIG. 11 is a timing chart showing another example of timing of the disconnect signal line at the time of flow control used in the embodiment.

In this example, not the manager node but the receiver node, which drives the disconnect signal line into the active-low state, accelerates the shift to the inactive-high state. This example is shown in FIG. 11.

If an overflow is detected at any receiver node during the multi-cast transfer, the receiver node drives the disconnect signal line into the active-low state for the first 1CLK cycle period and then into the inactive-high state for the next 1CLK cycle period. The disconnect signal line is changed to the active-low state from the inactive-high state set by the pull-up resistor R and, after the multi-cast transfer is stopped, it is quickly shifted to the inactive-high state. After that, the disconnect signal line is maintained in the inactive-high state by the pull-up resistor R.

Figure 12:
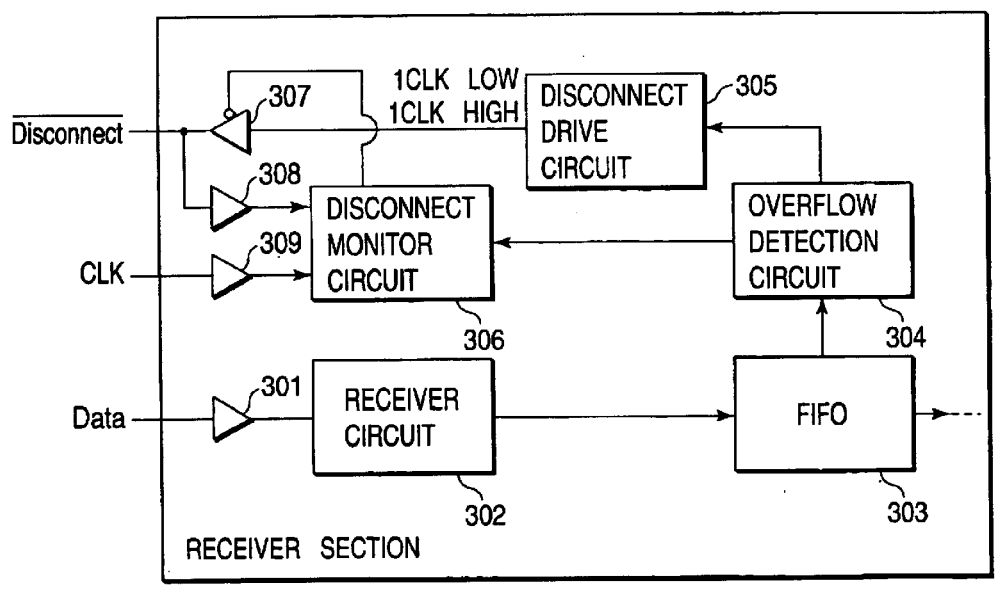
FIG. 12 is a block diagram showing an example of the hardware structure for achieving the timing of FIG. 11.

In order to accomplish the above control, a data receiving section of the respective nodes (including the manager node) is constituted as illustrated in FIG. 12.

The data receiving section includes a data input buffer 301, a data receiving circuit 302, an FIFO buffer 303, an overflow detection circuit 304, a disconnect signal drive circuit 305, a disconnect signal monitor circuit 306, a disconnect signal output 3-state buffer 307, a disconnect signal input buffer 308, and a clock input buffer 309.

The FIFO buffer 303 is a reception buffer for temporarily storing data received through the multimedia bus 200. Stream data, which is input via the data input buffer 301 and receiving circuit 302, is written to the FIFO buffer 303. The stream data is read out of the FIFO buffer 303 and processed in an internal processing circuit. The overflow detection circuit 304 detects whether an amount of data stored in the FIFO buffer 303 exceeds a predetermined threshold value. If the amount does, the circuit 304 generates an overflow detection signal. The overflow detection signal is supplied to the disconnect signal drive circuit 305 and disconnect signal monitor circuit 306.

Upon receiving the overflow detection signal, the disconnect signal drive circuit 305 drives the disconnect signal line into the active-low state for the first 1CLK cycle period using the disconnect signal output 3-state buffer 307, and then drives it into the inactive-high state for the next 1CLK cycle period.

The disconnect signal monitor circuit 306 monitors the disconnect signal line through the input buffer 308, when overflow detection signal is input. When the circuit 306 detects that the disconnect signal line has asserted as the active-low state at the rising edge of a clock CLK, it sets the disconnect signal output 3-state buffer 307 in the high impedance state to inhibit the disconnect signal drive circuit 305 from driving the disconnect signal line. If it is not detected that the disconnect signal line has asserted as the active-low state when the overflow detection signal is input, the monitor circuit 306 allows the disconnect signal drive circuit 305 to drive the disconnect signal line.

In the above arrangement, too, the problem of a drive conflict among signals of the plural receiver nodes can be resolved without decreasing the bus use efficiency.

According to the system of the present embodiment described above, the use of the bus 200 in which the band-guaranteed cycle is defined as a transfer mode allows the band of stream data requiring a high degree of real time to be guaranteed. Usually data transfer cannot be intermitted during the band-guaranteed cycle; however, in the present invention, the transmission of stream data from the sender node can be stopped under the control of the receiver node, even during the band-guaranteed cycle.

The multi-cast transfer using the band-guaranteed cycle can be stopped even in response to an instruction from any receiver node. The provision of this scheme of stopping the multi-cast transfer of stream data under the control of the receiver node can prevent the buffer from overflowing even when such overflowing is likely to occur at any receiver node for the multi-cast due to a delay in the stream processing and reception of a variable bit rate stream. It is therefore possible to efficiently execute the multi-cast transfer of stream data through the bus 200 only with the least required buffer.

The scheme of avoiding the problem of a drive conflict among disconnect signals and the provision of the scheme of accelerating the de-assert of disconnect signals allow the flow control to be efficiently performed at the time of stream access by the multi-cast.

In the foregoing embodiment, the pull-up resistor R is connected to the disconnect signal line. However, it can be replaced with a pull-down resistor and, in this case, the disconnect signal line is driven into the active-high state by the open-drain output buffer of each node.

The system of the present embodiment can be used as a platform of various types of digital information device, such as set-top boxes, digital TVs and game machines as well as computers.

As described above, according to the present invention, the transfer of stream data, especially the multi-cast transfer can be performed on the bus with efficiency, and all the receiver nodes for the multi-cast transfer can be prevented form overflowing without providing any huge buffers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing apparatus comprising:

a bus for which a band-guaranteed cycle capable of transferring stream data in real time by assigning a predetermined reserved band for each cycle time, is defined, the bus including a signal line which indicates a completion of a current data transfer cycle on the bus;

a plurality of nodes connected to said bus and capable of transmitting/receiving stream data using the band-guaranteed cycle, the plurality nodes being connected to the signal line in a wired OR fashion; and means for executing a multi-cast transfer of stream data from a sender node to a plurality of receiver nodes using the band-guaranteed cycle, the sender node including a unit configured to stop the multi-cast transfer when the signal line is driven into an active state.

2. The data processing apparatus according to claim 1, wherein one of a pull-down load circuit and a pull-up load circuit is connected to the signal line, and each of the receiver nodes includes an output buffer connected to the signal line to drive the signal line into the active state.

3. The data processing apparatus according to claim 2, further comprising acceleration means for driving the signal line into an inactive state for a predetermined time period after the signal line is driven into the active state by the receiver node in order to accelerate a shift of the signal line to the inactive state.

4. The data processing apparatus according to claim 3, wherein the plurality of nodes include a manager node for controlling said multi-cast transfer, and the manager node comprises said acceleration means.

5. The data processing apparatus according to claim 1, wherein each of the plurality of nodes includes:

drive means for driving the signal line into the active state for a predetermined time period when an amount of data stored in a receiving buffer for receiving stream data transferred by the multi-cast transfer, exceeds a given value, and driving the signal line into an inactive state after the predetermined time period has elapsed; and means for monitoring a state of the signal line and inhibiting the drive means from driving the signal line when detecting that the signal line is driven into the active state by another node.

6. A data processing apparatus comprising:

a bus for which a band-guaranteed cycle capable of transferring stream data in real time by assigning a predetermined reserved band for each cycle time, is defined, the bus including a signal line which indicates a completion of a current data transfer cycle on the bus;

a plurality of nodes connected to said bus and capable of transmitting/receiving stream data using the band-guaranteed cycle, the plurality of nodes being connected to the signal line in a wired OR fashion; and means for executing a multi-cast transfer of the stream data from a sender node to a plurality of receiver nodes using the band-guaranteed cycle by assigning one of plurality of channel number to the sender node and the plurality of receiver nodes, the sender node including a unit configured to stop the multi-cast transfer when the signal line is driven into an active state, wherein each of the plurality of nodes includes:

drive means for driving the signal line into the active state for a predetermined time period when an amount of data stored in a receiving buffer for receiving stream data transferred by the multi-cast transfer, exceeds a given value, and driving the signal line in an inactive state after the predetermined time period has elapsed; and means for monitoring a state of the signal line and inhibiting the drive means from driving the signal line when detecting that the signal line is driven into the active state by another node.

* * * * *